United States Patent Office 3,338,871
Patented Aug. 29, 1967

3,338,871
PROCESS FOR PREPARING POLYEPOXIDE COMPOSITIONS
Eduard J. W. Vogelzang and Johannes Beevendorp, Delft, Netherlands, assignors to Shell Oil Company, New York, N.Y., a corporation of Delaware
No Drawing. Filed Oct. 26, 1964, Ser. No. 406,574
Claims priority, application Netherlands, Oct. 30, 1963, 299,937
9 Claims. (Cl. 260—47)

This invention relates to a process for the preparation of polyepoxide compositions curable with polycarboxylic acid anhydrides. More particularly, the invention relates to a process for the preparation of polyepoxide compositions curable with polycarboxylic acid anhydrides wherein the cure thereof is accelerated by the presence of a trialkanolamine contained in said composition.

Specifically, the invention provides a process for the preparation of polyepoxide compositions, which are stable during storage, are curable with polycarboxylic acid anhydrides to infusible and insoluble resins, and which contain as an accelerator for the cure thereof from 0.01 to 0.1 part of a trialkanolamine borate per hundred parts of polyepoxide.

It is known to use small quantities of amines as accelerator in the curing of polyepoxides with polycarboxylic acid anhydrides. Polyhydric alcohols have also been used as accelerator. Polyhydric alcohols have the advantage that they can be added beforehand to the polyepoxide without having a disadvantageous effect on the storage time thereof. When, however, a polyepoxide having less than 0.12 hydroxy equivalent per 100 g. of polyepoxide is used, the accelerating effect of polyhydric alcohols is particularly slight. Amine accelerators generally have the drawback that they cannot be mixed beforehand with the polyepoxide, since storage stability and stability at elevated temperature of such mixtures are unsatisfactory.

It is, therefore, an object of the invention to provide a process for the preparation of polyepoxide compositions curable with polycarboxylic acid anhydrides in a manner in which the pot life of the mixture of composition and anhydride can be controlled by an accelerator present in said composition, and to cured compositions prepared therefrom. It is another object to provide polyepoxide compositions as characterized above wherein the polyepoxide contains at most 0.12 hydroxy equivalent per 100 grams of the polyepoxide, and the composition has no activity at room temperature. Other objects and advantages of the invention will be apparent from the following detailed description thereof.

It has now been found that these and other objects may be accomplished by a process which comprises adding to a polyepoxide material having an average of more than one vic-epoxy group per molecule from about 0.01 to 0.1 part by weight of a trialkanolamine borate per hundred parts by weight of polyepoxide. The trialkanolamine borate accelerators make possible an accurate adjustment of the work-up time of polyepoxide-polycarboxylic acid anhydride mixtures at elevated temperatures. Polyepoxide compositions containing trialkanolamine borates are stable during storage and have a very low sensitivity to prolonged heating as evidenced from only a slight increase in the viscosity of said composition after heating for 24 hours at 120° C.

The compositions of the invention are particularly suitable in the manufacturing of objects, such as coatings and laminated materials, in which liquid mixtures of the polyepoxide composition and polycarboxylic acid anhydrides are cured at elevated temperatures wherein the shaping of the mixture is necessary. The compositions are also suitable for the manufacturing of cured castings, for embedding electrical equipment, for sealing electrical appliances and parts thereof, with or without the use of solvents. The criterion of the curing rate is usually the gelling time of the relevant mixture at 120° C. The working-up time, i.e., the time during which the mixture can still be poured at elevated temperatures, is also very important.

The polyepoxide materials used in preparing the compositions of the present invention comprise those organic materials which have more than one vic-epoxy group, i.e., more than one

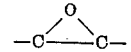

group, which group may be in a terminal position, i.e., a

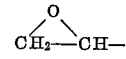

group, or in an internal position, i.e., a

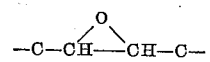

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)-propane (Bisphenol-A), 2,2-bis(4-hydroxyphenol)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

It is preferred to use polyglycidyl ethers having a low hydroxyl number, for instance lower than 0.12 hydroxy equivalent per 100 g. Preferred polyglycidyl ethers are the polyglycidyl ethers of dihydric phenols, for example those containing at least 0.47 epoxy equivalent per 100 g., such as liquid polyglycidyl ethers with a viscosity of between 100 and 150 poises at 25° C., or with a viscosity lower than 100 poises at 25° C. Particularly preferred are the polyglycidyl ethers at 2,2-bis(4-hydroxyphenyl)propane. Use may also be made of mixtures of liquid polyglycidyl ethers of 2,2-bis(4-hydroxyphenyl)propane with 3–20° by weight of other glycidyl compounds, such as polyglycidyl ethers of diphenylolmethane, polyglycidyl ethers of diphenylol-ethane, glycidyl ethers of monohydric alcohols and phenols, and glycidyl esters of monohydric aliphatic monocarboxylic acids in which the carboxyl group is attached to a tertiary or quaternary carbon atom.

Polyglycidyl ethers derived from polyhydric phenols and having less than 0.12 hydroxy equivalent per 100 g. may be prepared by reacting a polyhydric phenol with an excess of epichlorohydrin or dichlorohydrin with the addition of alkali metal hydroxide, for example at temperatures between 50° C. and 150° C. When the starting material used is a dihydric phenol, at least 4 mol, for example 10 mol, of epichlorohydrin or dichlorohydrin per mol of dihydric phenol are employed; the resultant polyglycidyl ether is usually a mixture of polyethers having the general formula

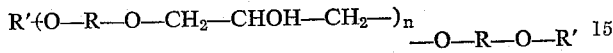

in which $n$ is a number having an average value of between 0 and 0.1, R is the hydrocarbon group of the dihydric phenol and R' is a glycidyl group in which a small portion thereof, for instance up to 10%, of the glycidyl groups may be dihydroxypropyl and chlorohydroxypropyl groups.

While the polyglycidyl ethers of dihydric phenols are the preferred polyepoxide materials, the following groups of polyepoxides are also suitable materials in forming the compositions of the invention.

Other polyepoxides include the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated castor oil, methyl linoleate, butyl linolinate, ethyl 9,12-octadecadienoate, butyl 9,12,15-octadecatrienoate, ethyl elostearate, octyl 9,12-octadecdienoate, methyl elostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl) oxalate, di(2,3-epoxyhexyl)succinate, di(2,3-epoxyoctyl) tetrahydrophthalate, di(4,5-epoxydodecyl)maleate, di(2,3 - epoxybutyl)terephthalate, di(2,3 - epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example dimethyl 8,9,11,13-diepoxyeicosanedioate, dibutyl 7,8,11,12-diepoxyoctadecenedioate, dioctyl 10,11-diethyl-8,9,12,13-diepoxyeicosanedioate, dicyclohexyl 3,4,5,6-diepoxycyclohexane-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,2-bis(cyclohexenyl)propane, 2,2-bis(cyclohexenyl)butane, 8,10-octadecadiene and the like.

The trialkanolamine borates suitable as accelerators in the polyepoxide compositions of the invention are those of the formula

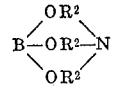

wherein $R^2$ is an alkylene group of from 2 to 5 carbon atoms, such as ethylene, n-propylene, isopropylene, butylene, isobutylene, etc.

The quantity of trialkanolamine borate in compositions according to the invention is 0.01 to 0.1, preferably 0.01 to 0.05 part by weight per 100 parts by weight of polyglycidyl ether of polyhydric phenol. Examples of trialkanolamine borates include triethanolamine borate, which is preferred, and triisopropanolamine borate. Such trialkanolamine borates are esters of trialkanolamine and boric acid; they may be prepared by heating a mixture of equimolecular quantities of trialkanolamine and boric acid to a temperature of approximately 150° C. with removal of the water formed, for example by distillation under reduced pressure.

The trialkanolamine borate may be mixed in the above-mentioned quantities with the polyglycidyl ether in one or more steps. The preferred polyepoxide for the compositions of the invention are the liquid polyepoxides. However, solid polyepoxides may be blended with liquid polyepoxides or mixed with a sufficient amount of a solvent therefor to form a solution or dispersion thereof. Suitable solvents include the inert hydrocarbons, such as xylene, toluene, cyclohexane, and the like. Thus, for example, the desired quantity of trialkanolamine borate may be dissolved in a portion of the polyepoxide, and this concentrated solution may subsequently be mixed with the remaining quantity of polyepoxide. The present compositions are stable during storage and have a very low sensitivity to prolonged heating, as is, for instance, apparent from the slight increase in viscosity after heating for 24 hours at 120° C. When trialkanolamine borates are used in the above-mentioned quantities as accelerator for curing polyepoxide with polycarboxylic acid anhydrides, the accelerator and the polyepoxide may therefore be mixed beforehand, this mixture may be stored, the quantity necessary for use weighed out and heated to the desired mixing temperature. It is also possible to heat a relatively large quantity of mixture to the desired temperature, and to weigh out a portion from this mixture for mixing with polycarboxylic acid anhydrides.

The compositions according to the invention may be cured to infusible solids at elevated temperature, e.g., from about 100° C. to 200° C. or even higher, with many polycarboxylic acid anhydrides. Some examples of polycarboxylic acid anhydrides often used are phthalic anhydride, hexahydrophthalic anhydride, tetrahydrophthalic anhydrides, pyromellitic dianhydride, endomethylene tetrahydrophthalic anhydride, methyl endomethylene tetrahydrophthalic anhydride, succinic anhydride, alkyl succinic anhydrides, such as dodecenyl succinic anhydride and hexachloro endomethylene tetrahydrophthalic anhydride. Mixtures of polycarboxylic anhydrides may also be used. The process according to the invention is of particular value when polycarboxylic acid anhydrides having a high melting point, for example above 100° C., are used for curing, such as phthalic anhydride, tetrahydrophthalic anhydride, pyromellitic dianhydride, endomethylene tetrahydrophthalic anhydride, and hexachloroendomethylene tetrahydrophthalic anhydride. When cured, the resulting solid resins are insoluble in solvents which dissolve the uncured composition such as benzene and toluene.

The ratio of polycarboxylic acid anhydride to polyepoxide (expressed in the ratio of acid equivalent to epoxy equivalent) is very important for obtaining a well-cured product. This ratio is always higher than 0.8 and is usually taken between 1.0 and 2.3. When phthalic anhydride is used this ratio is preferably between 1.1 and 1.7.

In the curing of the present compositions with high-melting polycarboxylic acid anhydrides it is a great advantage that the working-up time at the usual high temperatures can be varied within a wide range, and can be accurately adjusted at the desired value, by the choice of the quantity of trialkanolamine borate. In general the working-up time decreases as the quantity of trialkanolamine borate increases. When using phthalic anhydride, which gives a low curing rate, a working-up time at 120° C. of between 90 and 200 minutes is usually required, the working-up time being defined as the time in which a mixture kept at 120° C. of 100 parts by weight of polyepoxide and 65 parts of phthalic anhydride has attained a viscosity of 1500 centipoises, measured at 120° C. When in this case a polyglycidyl ether of 2,2-bis(4-hydroxyphenyl)propane having more than 0.5 epoxy group per 100 g. and a viscosity of 80–100 poises at 25° C. is used together with triethanolamine borate in quantities of 0.01–0.05 part by weight per 100 parts by weight of polyglycidyl ether as accelerator, the working-up time is, at a first approximation, inversely proportional to the square root of the quantity of triethanolamine borate.

Fillers, pigments, dyes and plasticizers such as aromatic extracts of high-boiling petroleum fractions, for example lubricating oil fractions, asphalt and the like, may be added to the present compositions.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

The polyepoxide (polyepoxide Al) used is a polyglycidyl ether of 2,2-bis(4-hydroxyphenyl)propane which is obtained by the reaction of 2,2-bis(4-hydroxyphenyl)-propane with a tenfold excess of epichlorohydrin with the addition of a sodium hydroxide solution; the polyglycidyl ether has a viscosity of 90 poises at 25° C., 0.532 epoxy equivalent per 100 g. and 0.041 g. and 0.041 hydroxy equivalent per 100 g.

*Example I*

In this example a comparison is made of the curing rates of mixtures of 65 parts of phthalic anhydride and 100 parts of polyepoxide Al, to which quantities of accelerator is added according to the table below. As criterion of the curing time, the time (in hours) is taken in which the relevant composition gelled at 120° C. Without accelerator no gelling was observed after 7 hours at 120° C.

TABLE I

| Test No. | Accelerator | Quantity of accelerator in parts per 100 parts of polyepoxide Al | Gelling time |
|---|---|---|---|
| 1 | Triethanolamine borate | 0.05 | 1–2 |
| 2 | Ethylene glycol | 2 | 5–6 |
| 3 | Trimethylol propane | 2 | 6–7 |
| 4 | Piperidine | 0.006 | 6–7 |
| 5 | BF₃-benzyl amine | 0.05 | 6–7 |
| 6 | Triisopropanolamine borate | 0.05 | 1–2 |

From the gelling times according to Table I the very good accelerating effect of trialkanolamine borates (Experiment 1 and Experiment 6) is apparent.

*Example II*

This example demonstrates that the working-up time of mixtures of polyepoxide and polycarboxylic acid anhydride can be accurately adjusted by the choice of the quantity of trialkanolamine borate.

Mixtures of 65 parts of phthalic anhydride and 100 parts of polyepoxide Al, to which triethanolamine borate had been added in quantities according to Table II, are kept at 120° C. The working-up time is shown by the time (in minutes) in which the viscosity of the composition kept at 120° C. attained the value of 1500 centipoises (measured at 120° C.).

TABLE II

| Test No. | Triethanolamine borate (parts per 100 parts of polyepoxide Al) | Working-up time (min.) at 120° C. |
|---|---|---|
| 1 | —— | >400 |
| 2 | 0.01 | 258 |
| 3 | 0.02 | 170 |
| 4 | 0.03 | 134 |
| 5 | 0.04 | 113 |
| 6 | 0.05 | 97 |

*Example III*

100 parts of polyepoxide Al are mixed with 0.015 part of triethanolamine borate. The viscosity is 90 poises at 25° C. After 24 hours heating at 120° C., the viscosity (again determined at 25° C.) has risen to only 96 poises. After addition of 65 parts of phthalic anhydride the working-up time (determined in the same way as in Example II) is 200 minutes.

*Example IV*

Related results are obtained when polyepoxide Al of Example I is replaced with equivalent amounts of each of the following: diglycidyl ester of tetrahydrophthalic acid, epoxidized ethylene glycol di(2,3-epoxycyclohexanoate) and the epoxidized ester of butyl linolinic acid.

*Example V*

Related results are also obtained in Example I when equivalent amounts triisopropanolamine borate is used in place of triethanolamine borate.

We claim as our invention:

1. A process for preparing a heat-curable polyepoxide composition which is stable during storage which comprises mixing (1) a polyepoxide containing more than one vic-epoxy group per molecule with (2) a polycarboxylic acid anhydride in the presence of (3) from about 0.01 to 0.1 part by weight per 100 parts by weight of the polyepoxide of a trialkanolamine borate having the formula

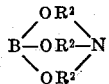

wherein $R^2$ is an alkylene group of from 2 to 5 carbon atoms, the ratio of acid equivalents to epoxy equivalents being at least 0.8.

2. A process according to claim 1 wherein the polyepoxide is a polyglycidyl ether of a dihydric phenol.

3. A process according to claim 2 wherein the dihydric phenol is 2,2-bis(4-hydroxyphenyl)propane.

4. A process according to claim 2 wherein the polyglycidyl ether contains at most 0.12 hydroxy equivalent per 100 grams of said ether.

5. A process according to claim 4 wherein the ether is a liquid polyglycidyl ether having a viscosity lower than 100 poises at 25° C.

6. A process according to claim 1 wherein the trialkanolamine borate is triethanolamine borate.

7. A heat-curable composition comprising (1) a polyepoxide containing more than one vic-epoxy group per molecule, (2) a polycarboxylic acid anhydride, and (3) from 0.1 to 0.1 part by weight per 100 parts by weight of the polyepoxide of a trialkanolamine borate having the formula

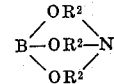

wherein $R^2$ is an alkylene group of from 2 to 5 carbon atoms, the ratio of acid equivalents to epoxy equivalents being at least 0.8.

8. A composition according to claim 7 wherein said ether is a liquid polyglycidyl ether of 2,2-bis(4-hydroxyphenyl)propane.

9. A heat-curable molding composition which comprises (1) a polyglycidyl ether of a dihydric phenol having more than one vic-epoxy group per molecule and having not more than 0.12 hydroxy equivalent per 100 grams of ether, (2) phthalic anhydride, and (3) from 0.01 to 0.1 part of a trialkanolamine borate selected from the group consisting of triethanolamine borate and triisopropanolamine borate, the ratio of acid equivalent to epoxy equivalent being between about 1.1 and 1.7.

References Cited

UNITED STATES PATENTS

| | | | |
|---|---|---|---|
| 2,768,153 | 10/1956 | Shokal | 260—47 |
| 2,871,454 | 1/1959 | Langer | 260—47 |
| 2,955,101 | 10/1961 | Bruin et al. | 260—47 |
| 3,052,650 | 9/1962 | Wear et al. | 260—47 |

SAMUEL H. BLECH, *Primary Examiner.*

WILLIAM H. SHORT, *Examiner.*

T. D. KERWIN, *Assistant Examiner.*